Jan. 12, 1932.  L. H. WHEELER  1,840,759
PUMPING MEANS FOR GASOLINE GAUGES
Original Filed June 22, 1925
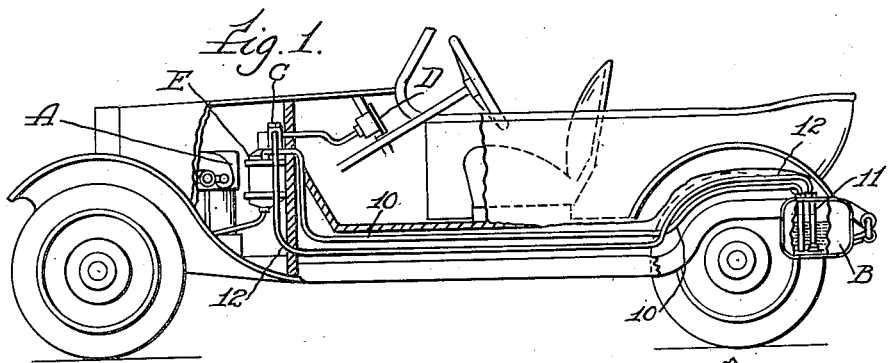
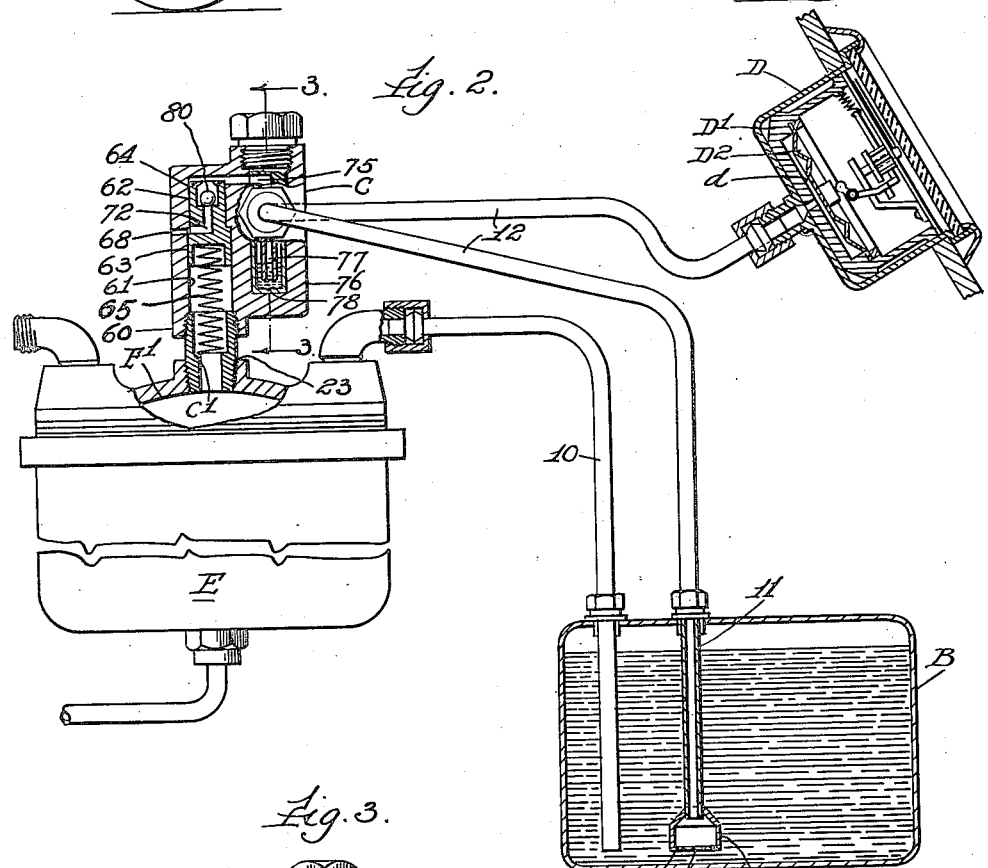
Inventor
Leonard H. Wheeler.
by Burton & Burton
his Attorneys.

Patented Jan. 12, 1932

1,840,759

UNITED STATES PATENT OFFICE

LEONARD H. WHEELER, OF CHICAGO, ILLINOIS, ASSIGNOR TO STEWART-WARNER CORPORATION, OF CHICAGO, ILLINOIS, A CORPORATION OF VIRGINIA

PUMPING MEANS FOR GASOLENE GAUGES

Original application filed June 22, 1925, Serial No. 38,946. Divided and this application filed February 16, 1931. Serial No. 515,945.

This application is a division of my application Serial No. 38,946, filed June 22, 1925, and now still pending in the Patent Office.

The purpose of the invention to be covered in this divisional application is to provide a pumping device suitable for operation of a depth indicating device of the character shown in my said pending application Serial No. 38,946, particularly adapted for indicating the depth of gasolene in the main fuel supply tank carried by a motor vehicle having an indicating element or gauge face mounted upon the forward part of the vehicle, and therefore at a considerable distance from the tank, the depth of whose liquid contents is to be indicated. This invention consists in the elements and features of construction shown and described as indicated in the claims.

In the drawings:

Figure 1 is a diagrammatic view presenting a motor vehicle having a fuel tank equipped with the construction embodying this invention.

Figure 2 is a diagrammatic view consisting of a vertical section of the fuel container and pressure pipe leading therefrom to the gauge, a vertical section of the pumping device connected to the pipe line from the container pressure pipe to the pressure gauge, and a vertical section of a conventional construction of the nature of a pressure gauge.

Figure 3 is a section at the line 3—3 on Figure 2.

In the construction shown in the drawings, referring to the diagrammatic view of Figure 1, the engine to be supplied with the fuel is seen at A, the main fuel supply tank at the rear of the vehicle is seen at B. D indicates the pressure gauge mounted at the dash and E is the familiar vacuum tank to which the fuel is lifted by suction of the engine from the low tank, B, and which, in the present invention, has the vacuum chamber, E¹, connected by the pipe, C¹, with the pumping device indicated in totality by C.

The fuel pipe line leading from the main supply tank, B, to the vacuum tank, E, is indicated at 10. Mounted fixedly with respect to the tank, B, and dependent therein opening for intake in the tank at a point below the lowest liquid level to be indicated, is a pressure pipe, 11, which extends out through the top of the tank and is connected by a pipe, 12, with the chamber, $d$, of the pressure gauge, D, for communicating to the pressure-responsive element, D², of the pressure gauge, the pressure of the head of liquid in the tank, B, which, having sealed the lower intake end of the pipe, 11, tends to compress the air in that pipe more or less as the liquid head in the tank is greater or less, this pressure indicated at the pressure gauge being therefore a correct measure of the depth of the liquid in the tank, unless in any instance there be air leakage at any point in the pressure line between the tank and the pressure gauge, or the equivalent of air leakage consisting in the absorption of air by the liquid.

One purpose of the invention disclosed in my said pending application Serial No. 38,946 as above mentioned, is to avoid error in the indication of the pressure gauge which might be caused by leakage of air in the pressure connection or absorption of air by the liquid whose depth is to be indicated; and the pumping device of this divisional application constitutes the mechanical means for preventing such error.

The expedient for preventing this error in the depth indication, described without regard to the mechanism by which it is carried out, consists in intermittently introducing air into the conduit which extends between the pressure gauge and the pressure pipe intake to an extent sufficient to momentarily cause a discharge of air from said conduit out through the intake of the pipe, 11, substituting fresh air forced in by the expelling means so that upon cessation of the pressure by which the air is thus expelled,—which pressure, so far as by reason of inertia of the liquid it may exceed that of the hydrostatic pressure of the liquid content of the tank, is relieved instantly upon the venting which occurs at the lower end of the pipe, 11, from which the air bubbles up through the liquid,—the head of liquid in the tank will operate normally for causing the liquid to be forced up into the pressure pipe and maintain the compression of the fresh air in normal condition therein for transmitting pressure to the pressure-responsive element of the pressure gauge which shall be truly indicative of the head of liquid in the tank.

The 'mechanical means for carrying out this expedient consists of the air pumping device shown in the drawings which will now be described.

This pumping device is interposed in the pipe, 12, and is adapted to be operated by intermittent suction which is operative in the vacuum chamber of the vacuum tank, E.

Referring to Figure 2:—The pump chamber, 60, comprises a larger diametered portion, 61, and a smaller diametered portion, 62, at the inner end of the larger portion, that is, at the end toward which the piston member, 63, 64, is thrust and held yieldingly by the spring, 65, at the normal position of the parts. The larger and smaller portions of the piston, 63, 64, correspond in their diameters respectively to the larger and smaller portions of the piston chamber. The larger portion of the chamber has a free atmosphere inlet, as seen at 68, at the inner end, that is, adjacent to the opening of the smaller portion of the chamber from the larger chamber, this inlet port, 68, being designed to be sufficiently free to permit the piston to be thrust in by the spring, 65, without any substantial resistance or impediment by reason of the necessity for driving the air out through said inlet port; from which it results also that the retraction of the piston by suction at the suction phase of the vacuum tank is not materially impeded by resistance to the inflow of air through said relatively free inlet port.

There is formed integrally with the pump barrel and located laterally with respect thereto a chamber, 76, and the discharge of air from the pump chamber by the spring-caused stroke of the piston is by way of the duct, 75, which leads from the upper end of the piston chamber by way of a downwardly extending pipe, 77, which opens at its lower end near the bottom of said laterally positioned chamber, 76, which contains a small amount of mercury, indicated at 78, into which the discharge end of the pipe, 77, projects slightly, causing said pipe to be sealed at its discharge. The two branches, 12, 12, of the pressure pipe are connected respectively at nipples, 76ª, 76ᵇ, which project from opposite sides of the chamber, 76, at a substantial distance above the mercury trap formed, as described, at the bottom of said chamber.

A duct constituting an air inlet or vent is shown at 72 leading through the smaller portion, 64, of the piston from the inner end thereof extending substantially to the plane of the enlargement to the greater diameter of the larger portion of the piston, and thence radially to the surface of the piston for communication with the inlet port, 68, formed as described through the wall of the larger portion of the piston chamber. The upper end of this duct is counterbored to form a valve seat for a check valve, 80, opening for movement of the air which enters through the port, 68, onward to the duct, 75, leading for connection with the tube, 77, to and through the mercury tube to the pressure pipe, 12.

The mercury trap described has the purpose of preventing leakage of air from the pipe line, 12, at either side. To insure against the possibility of the mercury being under any circumstances forced or drawn out of the trap, there is provided a felt plug, 82, in the chamber, 76, filling the annular space therein around the pipe, 77, and positioned for that purpose at the level of the connection of the two pipe members, 12, 12, with said chamber.

I claim:

1. A construction for the purpose indicated consisting of an air pumping device having its discharge furnished with two discharge connections adapted for communication respectively with a source of fluid pressure and with a pressure-responsive element, said pumping device comprising a piston chamber having a larger and a smaller part, a piston having corresponding larger and smaller parts, spring means yieldingly holding the piston at inthrust position occupying by its smaller part the smaller part of the piston chamber, the larger part of the piston chamber having relatively free atmosphere vent, the smaller part leading to the pump discharge and said two discharge connections.

2. An air pumping device for the purpose indicated comprising a piston chamber adapted and arranged for communicating at one end with a source of suction having a portion of its length toward said end of greater diameter than the remaining portion toward the opposite end; a piston reciprocable in said chamber having a portion at one end of greater diameter than the remainder, the greater and less diameters corresponding to those of the two portions of the chamber; a spring reacting on the piston for holding it yieldingly against movement in response to suction; the chamber having an air inlet opening laterally thereinto at the end of the larger diametered part of said chamber, the piston having a passage in its lesser diametered part leading from the smaller end of the piston and opening laterally thereof adjacent the larger diametered part, and a check valve in said passage seating in the direction of the suction.

3. An air pumping device for the purpose indicated consisting of a body having a cavity adapted for connection with a source of intermittent suction, a movable member for expanding and reducing the cavity; means yieldingly holding said member against movement in response to the suction through said connection, said body having an outlet from the cavity adapted for connection to transmit air pressure from the pumping device, and having an air inlet to the cavity positioned for admitting air to the cavity at the opposite side of the movable element from the suction connection, the passage from said air inlet to the outlet comprising a descending part succeeded by an ascending part; whereby the part of said passage between the descending and ascending portions constitutes a trap for liquid to be interposed in the line of pressure communicated from the pump to the outlet.

4. An air pumping device for the purpose indicated comprising a piston chamber communicating at one end with a source of suction having a portion of its length toward said end of greater diameter than the remaining portion toward the opposite end; a piston reciprocable in said chamber having a portion at one end of greater diameter than the remainder, the greater and lesser diameters corresponding to those of the two portions of the piston chamber; a spring reacting on the piston for holding it yieldingly against movement in response to the suction, the chamber having an air inlet port opening laterally thereinto at the end of the larger diametered part of said chamber, the piston having its lesser diametered part, a passage leading from the smaller end of the piston and opening laterally adjacent the larger diametered part, and a check valve in said passage seating in the direction of the suction.

5. A pumping device for the purpose indicated comprising a chambered element, a movable member by whose movement the capacity of the chamber is increased and reduced; means yieldingly holding said movable member against movement away from predetermined normal position, the chamber having an outlet duct and having an atmosphere inlet; means for controlling the air flow through the chamber operating for flow from the chamber toward said duct and against reverse flow; a source of alternating higher and lower pressures, and duct connections from said source through which the source pressure is communicated to the movable member of the pumping device.

6. In the construction defined in claim 5, the movable member being a piston having the larger and the lesser diametered part, a chamber having corresponding larger and lesser diametered parts, the atmospheric inlet port being at the point of the reduction of the chamber from larger to lesser diameter, and the piston having a duct registering at one end with said atmosphere port and extended thence through the lesser diametered part of the piston.

7. A pumping device for the purpose indicated including a piston chamber and a piston reciprocating therein, means holding the piston yieldingly toward one end of the piston chamber, the piston chamber having an outlet for a pressure discharge connection, the piston having at the inner end a reduced portion and the chamber having a reduced portion at the end toward which the piston is yieldingly held, and which is occupied by said reduced portion of the piston; the chamber having relatively free atmosphere inlet to the unreduced portion toward the end thereof at which said reduced portion is situated, and means obstructing the outlet from the inner end of the reduced portion of the piston.

8. A pumping device for the purpose indicated including a piston chamber and a piston reciprocating therein, means holding the piston yieldingly toward one end of the piston chamber, the piston chamber having an outlet for a pressure discharge connection, the piston having at the inner end a reduced portion and the chamber having a reduced portion at the end toward which the piston is yieldingly held, and which is occupied by said reduced portion of the piston; the chamber having relatively free atmosphere inlet to the unreduced portion toward the end thereof at which said reduced portion is situated, the atmosphere inlet passage including a duct in the reduced portion of the piston leading through said reduced portion for opening into the piston chamber at the larger portion thereof having the free atmosphere inlet; a check valve for controlling the air flow through the piston chamber toward said outlet connection, said check valve opening in the direction for inflow and constituting means for restricting the air inflow at the reduced portion of the chamber.

9. A pumping device for the purpose indicated comprising a chamber having a movable member by whose movement the cavity of the chamber is expanded and reduced; means yieldingly holding said movable member against movement away from a predetermined normal position, said cavity having an outlet to said duct and having an atmosphere inlet, means controlling the air flow operating for flow toward said duct and against reverse flow, said means including a valve; a source of intermittent suction and duct connection therefrom to a chamber of the pumping device at the opposite side of the movable member thereof from that at which the atmosphere inlet opens; the chamber mentioned including a piston chamber, the movable member comprising a piston reciprocating in the piston chamber, said piston having at the inner end a reduced portion, said chamber having a reduced portion at the end toward which the piston is yieldingly held and which is occupied by said reduced portion of the piston; the chamber having relatively free atmosphere inlet to the unreduced portion toward the end thereof at which said reduced portion is situated, the piston having a duct leading in laterally at the beginning of the reduced portion of the piston and extending longitudinally in said reduced portion to the end thereof, and a valve in said duct controlling and restricting the inflow of air therethrough.

In testimony whereof, I have hereunto set my hand at Chicago, Illinois, this 9th day of February, 1931.

LEONARD H. WHEELER.